Dec. 11, 1962   J. V. SKULLEY   3,067,769
VALVE STRUCTURE
Filed April 3, 1959
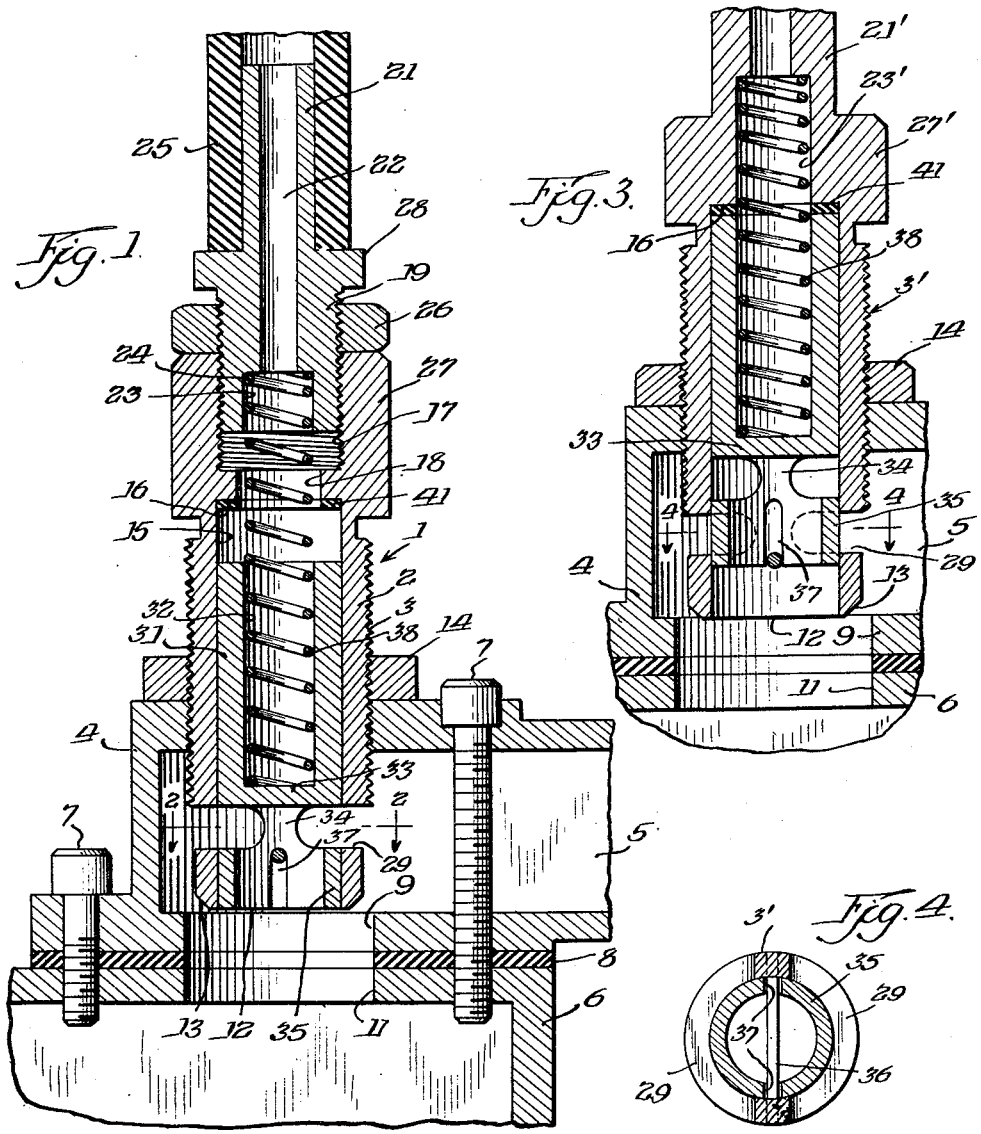
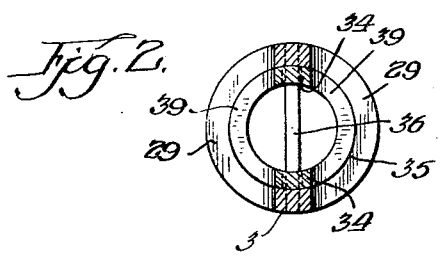
Inventor.
John V. Skulley.
By Hill & Hill
Attys.

United States Patent Office 3,067,769
Patented Dec. 11, 1962

1

3,067,769
VALVE STRUCTURE
John V. Skulley, 2305 S. Indiana Ave., Chicago 16, Ill.
Filed Apr. 3, 1959, Ser. No. 803,908
4 Claims. (Cl. 137—483)

The invention relates generally to valves and the like and more particularly to a valve structure for controlling the flow of a fluid such as a gas or the like.

The invention is particularly applicable to gas operated combustion engines, as for example, wherein propane gas and the like is utilized as the fuel. In such cases the gas intake structure is provided with an adjustable valve member generally corresponding to the needle valve in the carburetor of a gasoline engine and is adapted to control the combustible mixture by increasing the ratio of fuel to air.

However, as in the case of gasoline engines, additional fuel is often needed for acceleration and the like over and beyond that normally admitted to the engine and obviously where a fixed valve structure is employed, the engine is thus starved during period of acceleration. In gasoline engines this is overcome by an accelerating pump which is connected with the accelerator and is operative when the accelerator is depressed to pump an extra raw charge of gasoline into the carburetor to provide the desired additional power. Obviously an accelerating pump mechanism is not suitable for gaseous fuel. In the present invention the desired results are achieved by an auxiliary valve member forming a part of the valve structure and adapted under the desired conditions to open and permit an additional amount of gas to enter into the engine.

The present invention therefore has among its objects the production of a valve mechanism which may be substituted for the conventional valve mechanism now employed and provide an automatic increase in gas flow to the engine when the latter is placed under a load, the operation in the embodiment illustrated being accomplished by the use of manifold vacuum.

Another object of the invention is the production of such a valve structure which is exceedingly simple in construction, inexpensive to manufacture and which may be readily adjusted to give the desired results.

Many other objects advantages of the construction herein shown and described will be obvious to those skilled in the art from the disclosure herein given.

In the drawings, where like reference characters indicate like or corresponding parts:

FIG. 1 is a longitudinal sectional view through a valve structure embodying the present invention and the mounting structure of an engine to which it is to be applied, the valve structure being illustrated in an open position;

FIG. 2 is a transverse sectional view taken approximately on the line 2—2 of FIG. 1;

FIG. 3 is a sectional view similar to FIG. 1 but with the valve in closed position and illustrating an integral valve body; and FIG. 4 is a sectional view taken approximately on the line 4—4 of FIG. 3.

The particular embodiment of the invention illustrated contemplates the production of a valve member which is approximately the same size as the valve commonly employed, so that it may be substituted for the standard valve, the valve member being provided with an additional gas passageway which is controlled by a spring biased valve member adapted to be actuated by a suitable source of vacuum, as for example, from the manifold of the engine on which the valve is employed. The arrangement preferably is such that the valve member will normally be retained in a closed position, in opposition to the spring, by the engine manifold vacuum which will of course be high when the engine is not under load. However, when a load is placed upon the engine, the vacuum will diminish, permitting the spring to open the valve and increase the flow of gas into the engine.

Referring to the drawings, the reference numeral 1 indicates generally a valve member constructed in accordance with the present invention and having a cylindrical body portion 2 formed with external threads 3 thereon enabling the valve member to be threaded into a fitting 4 or the like, by means of which a fluid supply line 5 may be operatively connected to the intake manifold of a combustion engine through a suitable carburetor structure 6, only a fragmentary portion of which is illustrated in the drawings. The fitting 4 is secured to the carburetor structure 6 by screws 7, a suitable gasket or the like 8 being interposed between the two members. The later are provided with aligned bores 9 and 11 in the members 5 and 6 through which fluid such as propane gas may flow from the supply line 5 to the interior of the manifold 6, and it will be appreciated that if the valve member 3 were of a solid construction comparable to the standard valve, the lower end 12 thereof, which is provided with a beveled edge 13, would cooperate with the side walls of the bore 9 to define an annular shaped orifice through which the gas would be metered, the size of the orifice depending upon the axial relation of the beveled edge 13 and end 12 of the valve member with respect to the bore 9, the orifice being increased by moving the valve member upwardly as viewed in FIG. 1 or decreased by moving the same downwardly.

The vertical adjustment of the valve member may be fixed by suitable means such as a lock nut 14 threaded on the valve member and drawn down on the adjacent face of the fitting 4.

The body member 2 may be provided with a cylindrical axial bore 15 therein opening on the lower end 12 the bore being formed with an internal shoulder 16 therein and provided at its upper end with an internally threaded bore 17 which communicates through an opening 18 with the bore 15.

Threaded into the bore 17 is an externally threaded stem 19 which is provided with a tubular portion 21 at its upper end and having a passageway 22 extending axially through the member, the inner end being counterbored as indicated at 23 to form an internal shoulder 24. As illustrated in FIG. 1, the stem portion 21 is adapted to be inserted in the end of a manifold vacuum or the like for controlling the action of the valve member. The member 19 may be locked in adjusted position with respect to the body 2 by suitable means such as a lock nut 26, the upper portion 27 of the body 2 being provided with a hexagonal configuration so that the same may be grasped by a wrench to facilitate turning of the valve as well as holding the same while the lock nut 26 is drawn down thereon. Likewise the stem member 19 may be provided with a hex portion 28 by means of which the same may be engaged with a suitable wrench.

As clearly illustrated in FIGS. 1 and 2, the lower end of the body 2 is provided with a pair of almost semi-cylindrical openings 29 which are spaced upwardly from the end 12 but adapted to form communicating ports for the passage of gas or fluid from the interior of the fitting 4 through the openings 29 and interior of the valve member, through the lower end 12 of the latter into the ports 9 and 11 and ultimately into the intake manifold.

The ports 29 are adapted to be closed by a closure member indicated generally by the numeral 31 which is generally in the form of a hollow piston having an internal bore 32 closed at its lower end by a cross wall 33. Positioned below the latter and secured thereto by a pair of connecting portions 34 is a generally annular shaped closure ring 35.

The closure member 31 is retained in the bore 15 by a pin 36 carried by the body portion 2 and extending diametrically across the bore 15, the pin passing through a pair of diametrically opposed slots 37, engagement of the pin with the inner end of the slots 37 acting to restrict further outward movement of the member 31. The latter is urged in a downward direction as viewed in FIG. 1 or outward with respect to the open end of the bore 15 by a compression spring 38, the latter having one end positioned in the bore 32 and seated on the inner end face of the bore, the opposite end being seated in the counterbore 23 in the fitting 19 and engaged with the shoulder 24 therein.

The openings 39 defined by the member 35 and the adjacent wall 33 are of approximately the same size and configuration as the opening 29, so that when the closure member 31 is in its lowermost portion as illustrated in FIG. 1, the openings 29 and 39 will register and permit gas to flow therethrough and the interior of the member 35, out of the end 12 and ultimately into the intake manifold, such flow by-passing the metering orifice defined by the lower end of the valve member and the side wall of the bore 9.

It will be appreciated, referring to FIG. 3, that when the closure member 31 is in its innermost position as illustrated in FIG. 3, the closure portion 35 will be disposed adjacent the openings 29, operatively closing the same so that all gas flow will be through the metering orifice defined by the lower end of the valve member and the bore 9.

Assuming that the device is installed on a gas engine, using propane gas or the like, and the hose line 25 connected to a suitable source of manifold vacuum under a relatively closed throttle, as for example at idling speeds and when running at a steady speed, sufficient manifold vacuum will exist to oppose the action of the spring 38, thus raising the closure member to the position illustrated in FIG. 3 and limiting the gas flow to that determined by the metering orifice.

However, in the event a demand for power is made and the throttle opened for rapid acceleration or power, the engine manifold will be broken and the spring 38 will move the closure member 31 to the position illustrated in FIG. 1, permitting a greater flow of gas to enter the intake manifold by means of the auxiliary ports 29. When the throttle is again moved to a more closed position, the manifold vacuum will again be built up, resulting in closure of the valve and return of the control of gas flow to the metering orifice.

While I have illustrated in FIG. 1 a construction wherein the body 2 and member 19 are constructed as separate parts, if desired the entire body portion may be made as a single member, such a construction being illustrated in FIG. 3. In this case, the stem 21' is integrally connected to the hex portion 27' and the small bore 23' therein which is adapted to receive the upper end of the spring 38, corresponds to the counterbore 23. As illustrated in both FIGS. 1 and 3, an annular shaped cushion 41 may be positioned at the shoulder 16 against which the closure member 31 may seat to eliminate unnecessary noise caused by engagement of the closure member with the shoulder.

While it is believed that in most cases the construction illustrated in FIG. 3 will be preferable, due to its simplicity and low cost, in cases where it may be desired to provide an adjustment in the spring 38, the construction illustrated in FIG. 1 may be employed, it being noted that relative movement of the member 19 with respect to the body portion, results in a reduction or increase in the compression of the spring 38.

It will be noted from the above description that I have provided a very simple yet effective valve structure which is self-contained and may be readily substituted for a standard solid type of valve member commonly employed, so that installation of the present device merely requires substitution of the valve member and connection thereof to a source of manifold vacuum.

While in some cases a poppet type valve member could be employed at the end 12 to close the by-pass passageway, normally I prefer to use a construction such as that illustrated as a greater flow area may be obtained thereby.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a gas metering valve structure, the combination of a fitting having an inlet and an outlet port and a threaded opening opposite said outlet port, a cylindrical valve body formed with external threads thereon for adjustably mounting the body in said opening in operative relation to said outlet port, said body having an axial bore therein opening on one end thereof, the latter end being beveled along its outer periphery adapted to cooperate with the periphery of said outlet port to define a metering orifice, said body having a port in the side wall thereof adjacent said end cooperable with said axial bore to form a supplemental gas passageway bypassing such metering orifice, a closure member for said passageway axially movable in said bore, spring means carried by said body for operatively connecting a vacuum line to the interior of said bore to move said closure member into a closed position.

2. In a gas metering valve structure, the combination of a fitting having an inlet and an outlet port and a threaded opening opposite said outlet port, a cylindrical valve body formed with external threads thereon for adjustably mounting the body in said opening in operative relation to said outlet port, said body having an axial bore therein opening on one end thereof, the latter end being beveled along its outer periphery adapted to cooperate with the periphery of said outlet port to define a metering orifice, said body having a pair of oppositely disposed ports in the side wall thereof adjacent said end and cooperable with said axial bore to form a supplemental fluid passageway bypassing such a metering orifice, a closure member for said passageway having an annular sleeve portion movable axially in said bore, the side walls thereof being of an axial length to close said parts in one position, the inner end of said closure member having an axial bore therein, opening on such end, a compression spring positioned in said last mentioned bore and engageable with the bottom wall thereof and said body operative to urge the closure member in an opening direction, and means on said body for operatively connecting a vacuum line to the interior of said bore.

3. A valve structure as defined in claim 1, wherein said spring means comprises a compression spring having one end thereof engaging said closure member, and the opposite end engaging a member adjustably mounted in said body to vary the compression of said spring.

4. A valve structure as defined in claim 1, wherein said body and said connecting means are integrally formed.

References Cited in the file of this patent

UNITED STATES PATENTS

| | | |
|---|---|---|
| 868,219 | Pietzuch et al. | Oct. 15, 1907 |
| 1,005,409 | Burns | Oct. 10, 1911 |
| 1,593,766 | Hurd | July 27, 1926 |
| 2,124,633 | Robinson | July 26, 1938 |
| 2,762,614 | Schweiss | Sept. 11, 1956 |
| 2,952,272 | Hansen | Sept. 13, 1960 |

FOREIGN PATENTS

| | | |
|---|---|---|
| 657,491 | France | Jan. 15, 1929 |
| 802,375 | France | June 6, 1936 |
| 884,652 | France | May 3, 1943 |